United States Patent [19]

Berginski

[11] 4,336,428
[45] Jun. 22, 1982

[54] STEERING COLUMN ASSEMBLY SWITCH FOR AUTOMOTIVE VEHICLES

[75] Inventor: Werner E. Berginski, Werdohleveking, Fed. Rep. of Germany

[73] Assignee: Firma Leopold Kostal, Ludenscheid, Fed. Rep. of Germany

[21] Appl. No.: 47,335

[22] Filed: Jun. 11, 1979

[30] Foreign Application Priority Data

Jun. 29, 1978 [DE] Fed. Rep. of Germany ....... 2828592

[51] Int. Cl.³ .............................................. H01H 9/00
[52] U.S. Cl. ................................................ 200/61.54
[58] Field of Search ....................... 200/4, 61.27, 61.3, 200/61.34, 61.35, 61.54

[56] References Cited

U.S. PATENT DOCUMENTS 3,209,092 9/1965 Vitaloni et al. ................... 200/61.34
3,766,351 10/1973 Cryer ................................ 200/61.27
3,892,932 7/1975 Erdelitsch et al. .......... 200/61.54 X

FOREIGN PATENT DOCUMENTS

1001613 1/1957 Fed. Rep. of Germany .
2031344 12/1971 Fed. Rep. of Germany ... 200/61.54
2244091 3/1974 Fed. Rep. of Germany .
2534838 2/1977 Fed. Rep. of Germany ... 200/61.54

Primary Examiner—James R. Scott
Attorney, Agent, or Firm—Bacon & Thomas

[57] ABSTRACT

The invention concerns a steering column assembly switch for automotive vehicles with a supporting sleeve surrounding the casing tube of a steering mechanism and mountable thereon, supported by means of a roller bearing on the steering column and housing a plurality of switches, the sleeve having a hollow cylinder mounted at an acute angle to the axis of the sleeve, for a column lock and an ignition switch. The plurality switches are located in a common housing mounted on the supporting sleeve concentrically to the axis of said sleeve. The internal space is divided into two chambers by means of an annular disk and on both sides with conductor bars and switch contacts; each of the chambers contains an annular, rotatably and tiltably mounted sliding contact with a switching lever. At the insulating socket disk, two plates of an insulating material are arranged extending outwardly at right angles from said disk and equipped on both sides with conductor bars, wherein the corresponding conductor bars of the insulating socket disk and the insulating plates are electrically connected with each other and the free ends of the insulating plates are designed in the form of a plug-in part with contact prongs for multiple contacts. A cover plate for the housing contains indexing means for the turn signal switch.

12 Claims, 14 Drawing Figures

STEERING COLUMN ASSEMBLY SWITCH FOR AUTOMOTIVE VEHICLES

BACKGROUND OF THE INVENTION

The invention concerns a steering column assembly switch for automotive vehicles with a supporting sleeve surrounding the casing tube of a steering column and mountable thereon, supported by means of a roller bearing on the steering column, for the acceptance of a plurality of switches, such as the switches for turn signals, parking lights, windshield wipers, headlights and horn contacts, said sleeve being provided with a hollow cylinder mounted at an acute angle with respect to the axis of the sleeve, to house the functional parts of the integrated steering column lock and the ignition switch. Such switches are known from published German application Nos. 22 44 091 and 25 34 838 and German Pat. No. 75 14 138. All of the known switches contain a plurality of individual parts, consisting mainly of punched and pressure cast parts. Consequently, a large number of punching and bending tools is required, together with a multitude of process steps even during the manufacture of the individual parts and also for the assembly of the switches. Pressure cast parts require a considerable array of finishing operations, such as deburring, milling, turning and threading, which may be effected either by means of simple devices in a time consuming manner or with highly expensive machine tools. Furthermore, such switches consist of two individual switches arranged above each other and actuated by its own switching lever. The first individual switching assembly usually comprises the turn signal, parking light and headlight switching functions and the horn contact, the second individual switching assembly the wiper-washer function. Each individual switch has its own socket equipped with solid contacts and the necessary connections. The latter involves considerable expenses for materials, tools and assembly.

SUMMARY OF THE INVENTION

It is the object of this invention to provide a steering column assembly switch wherein the heretofore separate individual switches are combined in a common housing. The assembly consists of a minimum number of easily manufactured individual parts and should lend itself to ready assembly without the need for expensive equipment.

The object is attained according to the invention by the turn signal, parking light, wiper-washer and headlight switching switches being located in a common housing, mounted on the supporting sleeve concentrically with respect to the axis of the sleeve, the internal space of the housing is divided into two chambers by means of a circular socket disk made of an insulating material and provided with a center hole for the passage of the steering column and on both sides with conductor bars and points of contact, while each of the two chambers contains an annular, rotatingly and tiltingly mounted sliding contact with a switching lever. On an insulating socket disk, two plates of an insulating material are arranged, extending outwardly at right angles from said socket disk and also equipped on both sides with conductor bars, wherein the corresponding conductor bars of the insulating socket disk and the insulating bars are electrically connected with each other and the free ends of the insulating plates are designed in the form of plug-in parts with contact prongs for multiple contacts and that the cover plate of the housing contains the setting curves for the turn signal switch. The common housing for the two sliding contacts with the abovementioned functions results in a substantial simplification of the mechanical design. In particular, the common insulating socket disk carrying the bilateral points of contact, leads to significant savings in expensive individual parts, particularly punched parts, such as contact springs and the like. The socket plate may be produced by the technology of printed circuits and may be provided on both sides with conductor bars and points of contact. The setting curve for the turn signal switch is integrated with the cover plate, whereby not only an individual part is eliminated, but the performance of the function is improved.

The further development of the invention leads to a particularly stable arrangement, because the switch housing is integrated with the supporting sleeve, which is already integral with the steering column lock. The arrangement has very high stability and is thus simple to assemble.

A further development makes possible the direct switching of strong currents, which may be induction currents, such as, for example, the current washer-wiper or the headlight switch.

The functions of the turn signal blinker, parking light and grounding are assigned to the top side of the socket disk, whereby the conductor bars of said functions are connected with the conductor bars on one side of one of the insulating plates, while the conductor bars for the horn contact and also for a ground connection are conducted over the other side of the insulation involved, with the latter also carrying the points of contact for the headlight switch. The various conductor bars are thereby arranged on both sides of the insulating plate so that rapid testing of the switching functions is feasible; this in turn facilitates trouble shooting.

Switching functions of the windshield washer and wiper are assigned to the bottom side of the socket disk. The conductor bars are distributed over the conductor bars on both sides of the other insulating plate.

The invention lends great stability to the entire arrangement, because the insulating plates of the socket disk are solidly secured in said chambers.

Other features contribute to the strengthening of the mechanical structure of the switching assembly.

Means are also provided to ensure the cooling of the conductor plates of the insulating plates.

Potential damage due to the insertion of the coupling is eliminated. Measures result in the secure switching of headlights. The prestressed plate spring supported in knife edge bearings between the sliding contact and the switching rocker, together with the friction coupling of the sliding contact to the switching lever results in the switching lever being held in the zero position with the highest possible spring force, while the plate spring is greatly extended; this is particularly important in automotive vehicles in order to ensure the secure holding of the switching lever lever during impacts caused by poor road conditions, without rattling. The fact that during the switching process the force of the plate spring decreases as a function of its buckling, also appears to be advantageous, because a highly favorable switching characteristic is thus obtained.

Relief of tensile and compressive stresses on the conductor plate connection is provided, which particularly in a multiple part design of the common socket is highly sensitive, together with an easy mount support of the switching rocker.

Printed circuits provide for a simple assembly of the switch, assuring the secure alignment and fastening of the socket disk and the cover plate. This design makes it possible to assemble the switch without special mounting equipment, because all of the individual parts in essence are necessarily self-centering during their assembly. The exactly specified distances are also readily maintained during the assembly operation.

Other features permit the omission of expensive arresting means for the sliding contact of the wiper-washer unit. The definite contact of a dual arm spring with the arrest curve of the wiper-washer lever provides a pleasant switching sensation during the tilting motion of the switching lever. An arresting device assures the relief of stresses on the insulating plates generated by tensile and compressive forces. Means on the housing jacket make certain that the wiper-washer lever is secured in a central initial position and that it may be switched from this initial position into two opposing directions, whereby the tilting motion of the sliding contact is initiated. By means of the two arms of the dual arm spring, which are in contact with the stops in the initial position, a secure supporting of the switching lever in the direction of the axis of the steering column, without play, is obtained. Fingertip switching in the one direction for the washer pump and in the other direction for a rear window wiper is also provided.

BRIEF DESCRIPTION OF THE DRAWINGS

Embodiments of the invention will be explained hereinafter in the description with reference to the drawings attached hereto, wherein.

DESCRIPTION OF THE PREFERRED EMBODIMENTS

The steering column switch according to FIGS. 1–13 comprises a single piece, integrated housing 1 made of a thermoplastic synthetic material. The housing 1 has a supporting sleeve 2, surrounding the casing tube, not shown of the steering column and being supported itself by means of a bearing 3 on the steering column. The supporting sleeve 2 is secured to the casing tube by means of shackle-like protrusions 4, wherein the protrusions 4 may be supported by a safety ridge of the casing tube. A hollow cylinder 5 is combined in a single piece with the supporting sleeve 2, forming an acute angle with the axis of the sleeve and housing the functional parts of the steering column lock and the ignition switch. At the upper front end of the supporting sleeve 2 a housing floor 6 with a housing jacket 7 is formed on the sleeve to receive the functional elements of the steering column switch. Within the housing floor 6, three bearing brackets 8, 8' are provided at approximately equal distances, the function and role of which will be explained in detail hereinbelow. The bearing brackets 8, 8' include passage 9 aligned with its axis parallel to the axis of the supporting sleeve 2, while a reinforcing sleeve 10 equipped with internal threading, may be pressed into said passage. On the floor of the housing, inside, a gudgeon 11 is provided to anchor an angled spring 12, one leg 13 of which is secured to a projection 14 of the switch floor 6 and the other leg 15 equipped with a ledge 16 angled upwardly and bent in a convex manner with respect to the axis of the supporting sleeve 2. The jacket 7 of the housing has two cast-on foil strips 17 in contact by means of connecting plates 18 with the bushings 19 which, after the snap-in of the connecting plates 18, may be brought into alignment with the bearing brackets 8, as will be explained in more detail hereinafter.

Figure 1:
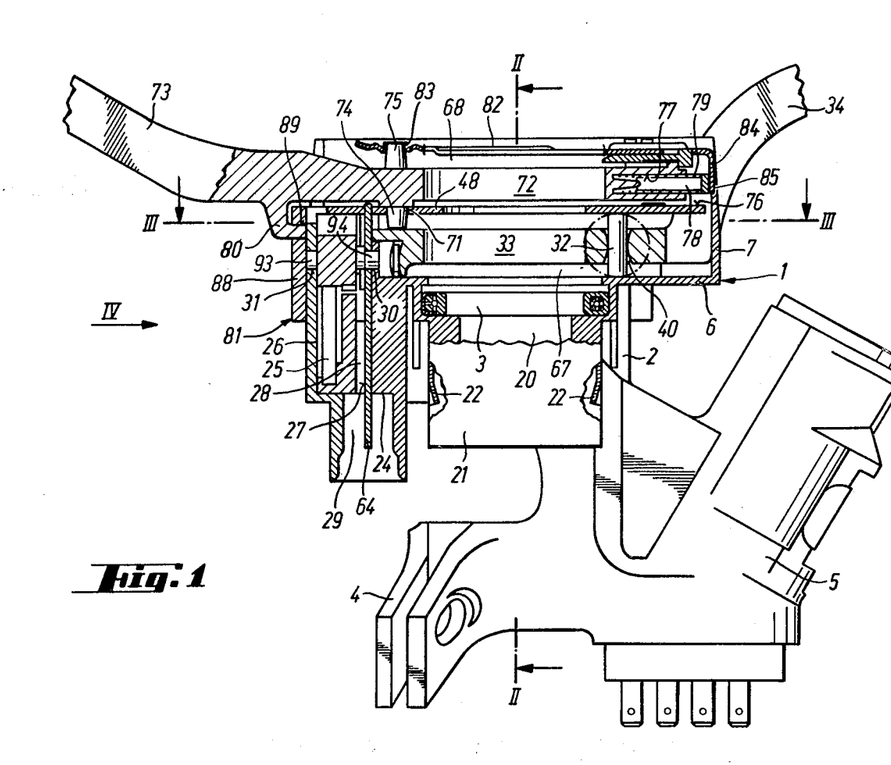
FIG. 1 is a view of the entire steering column assembly switch, in the upper part as an axial section and in the lower part as a partially perspective view.

In the floor 6 of the housing, a passage 20 into a chamber 21, is provided. The chamber 21 defines an essentially rectangular inner space and has on its internal walls a plurality of ribs 28 extending parallel to the axis of the supporting sleeve 2. Self-springing latch tongues 22 are located on the narrow sides of this chamber. The open end of the chamber 21 is designed as the receiving part for a plug connector, not shown, and is formed with steps 24 limiting the depth of penetration of the plug connector.

On the housing floor 6, a further chamber 25 is formed, angularly offset by about 90° with respect to the chamber 21, which, however, on its external side is closed off by means of a hinged cover 26. This chamber is provided with a rectangular passage 27, the longitudinal walls of which are also equipped with ribs 28, and described with a space to receive a reversing slide connector, to be described later. The chamber 25 terminates in a receiving part 29 for a plug connector. A hole 30 is provided in the housing wall 7, which is adjacent to the chamber 25 and aligned with a further hole 31 in the cover 26.

A gudgeon 32 is carried by housing floor 6 to bearingly support an annular slide 33 of the wiper-washer switching lever 34. In addition, a gudgeon 35 is located adjacent to a pocket of the housing jacket 7 to serve as the mount for an angle spring 36 (FIGS. 6 and 7), the legs 37 and 38 of which rest on stop dogs 39 of the housing jacket 7. In the initial position or base state, not shown, in FIG. 6, both legs 37 and 38 rest with their ends against the stop dogs 39 and are in a prestressed condition. The wiper-washer switching lever 34 carries, in a single piece embodiment, an approximately annular slide 33; see especially FIG. 3. The slide 33 has a bearing hole 40 with an approximately double funnel shaped profile; see FIG. 1. The slide 33 has a cutout of an approximately oval shape, in order to prevent contact with the steering column during the rotation of the slide around the gudgeon 32, as is known in the prior art. The slide 33 carries on its top side the connecting bridges 41 and 42 to switch into the different wiper stages and the interval wiper stage. Approximately diametrically opposed to the bearing hole 40 a locating edge 43 is provided and the notches of which define the various switching positions. The upwardly bent strip 16 of the angle spring 12 engages the notches of the locating edge 43, thus defining the arresting positions. The profile of the locating edge is chamferred and/or the strip 16 of the angle spring 12 is convex with respect to the locating edge.

A forked projection 44 (FIGS. 6 and 7) is formed on the switching lever 34, with the legs of said fork surrounding the legs 34 and 38 of the angle spring 36 and resting against said spring legs with their projections 45 and 46. Further, a cam 47 is provided on the switching lever 34 for the fingertip control of the washer and the rear window wiper. These switching functions will be further explained hereinbelow. In a first mode, the switching lever 34 with the slide 33 may be rotated around the gudgeon 32, whereby the different switching positions of the locating edge 43 are actuated. In addition, it is possible to effect a tilting motion, by activating the switching lever 34 in the two directions perpendicular to the plane of the drawing of FIG. 3. In the process, the slide 33 is held in the orientation defined by the locating edge 43 and tilts around said locating edge. The double funnel-shaped bearing hole 40 permits a corresponding motion about the gudgeon 32. During this tilting motion, in keeping with the direction of the switching lever 34, a projection 45 or 46 abuts against a leg 37 or 38 of the angle spring 36, so that the two fingertip control positions according to FIG. 6 and FIG. 7, respectively, are attained.

Figure 6:
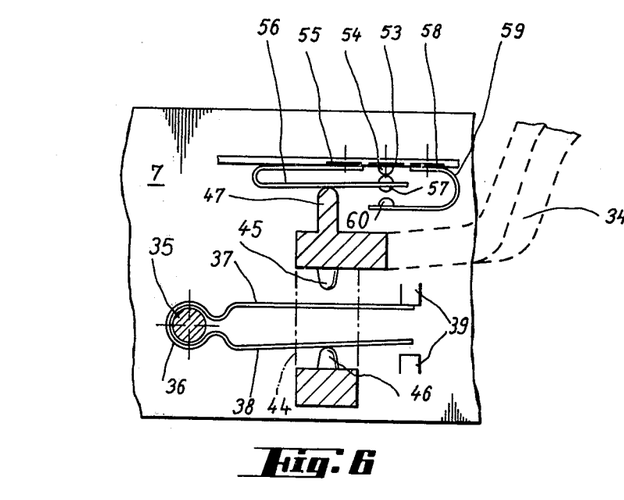
FIG. 6 is a schematized section taken on the line VI—VI in FIG. 3 for one fingertip control position.
Figure 11:
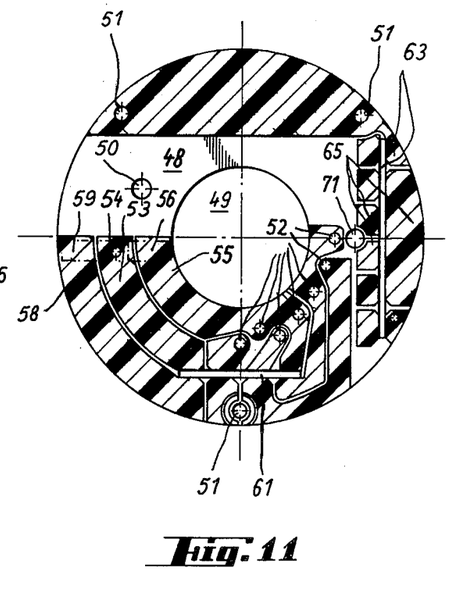
FIG. 11 is a bottom view of the socket plate.

As mentioned hereinabove, the connecting bridges 41 and 42, together with the switching cam 47 of the slide 33 and of the switching lever 34, respectively, are located on the upper side of said lever. These switching elements cooperate with the bottom side of an insulating socket disk 48, which is shown in FIG. 11. The insulating socket disk 48 may be embodied in the form of a printed circuit plate. The conductor bars are indicated in FIG. 11 by cross hatching. The printed circuit 48 is provided with a center hole 49, encompassing the steering column. A passage 50 is located in the insulating socket disk 48, receiving the upper end of the gudgeon 32, together with three passages 51, which coincide with the bearing brackets 8, 8'. FIG. 11 displays the shapes of the conductor bars and of the contact surfaces. In particular, the contact surfaces 52 for the different wiper stages and the interval wiper position are shown. These contact surfaces cooperate with the connecting bridges 41 and 42. Further, a conductor bar 53 is shown upon which a contact surface 54 is provided. On the conductor bar 55, which is connected with the power source of the vehicle by means of a current carrying line, a reversing contact spring 56 (FIG. 6) is mounted, said spring cooperating with a cam 47 of the switching lever 34 and carrying a double contact head 57. Another conductor bar 58 is connected with a stirrup-like contact spring 59 carrying a contact head 60 in opposition to the contact surface 54. The conductor bar 53 is connected with the conduit for the fingertip control of the wiper function, the conductor bar 58 with the conduit for the rear window wiper. FIG. 6 shows the tilting switching position wherein the switching lever 34 is drawn toward the driver in the axial direction of the steering column and FIG. 7 the opposite tilting position wherein the switching lever 34 is urged away from the driver. The initial position, wherein the two legs 37 and 38 of the angle spring 36 are resting against the stops 39 is not shown.

Figure 9:
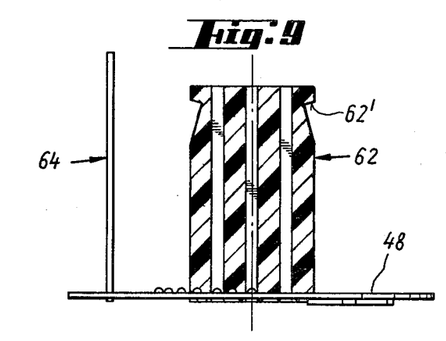
FIG. 9 is a side view of FIG. 8.
Figure 10:
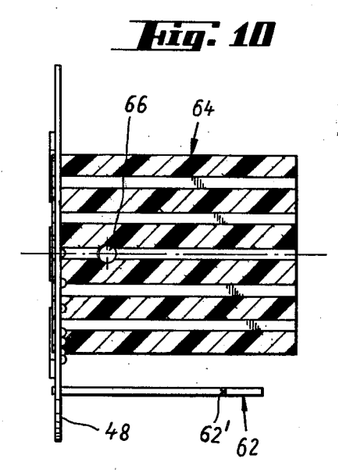
FIG. 10 is another side view of FIG. 8 with the inner side of the other insulating plate.
Figure 12:
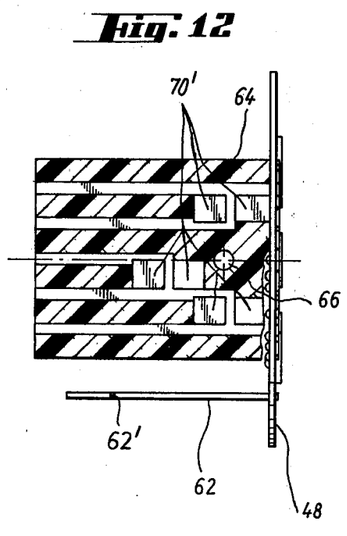
FIG. 12 is a side view of FIG. 11.
Figure 13:
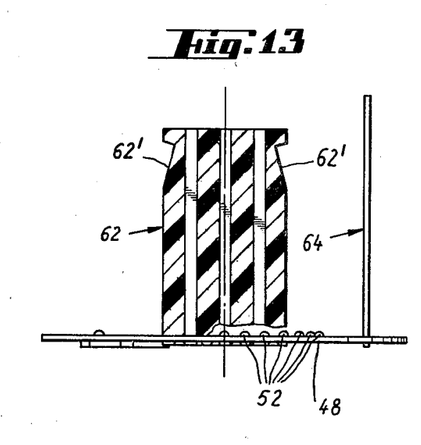
FIG. 13 is another side view of FIG. 11.

In the socket disk 48 a slit-like passage 61 may be seen (FIG. 11), wherein a first insulating plate 62 (FIG. 12) may be inserted. The insulating plate 62 is provided on both sides with conductor bars and has in its narrow sides arresting notches 62' (FIG. 13), corresponding to the arresting lashes 22 (FIG. 1). The insulating plate may also be designed in the form of a printed circuit. FIG. 13 shows the outer side of the insulating plate, i.e., the side facing away from the axis of the supporting sleeve 2; the inner side of this insulating plate is shown in FIG. 9. The insulating plate 62 is inserted with its upper front edge through the passage 61. A dip-soldering or other type of soldering operation is effected and the corresponding conductor bars of the insulating socket disk 48 and the insulating plate 62 conductingly joined together. These soldered joints also serve for the mechanical mounting of the insulating plate 62 in the insulating socket disk 48. The socket disk 48 has another slit-like passage 63 for a second insulating plate 64. The outer side of this insulating plate is shown in FIG. 12. This outer side of the insulating plate 64 is equipped with conductor bars and contact surfaces 70' for the switching of the headlights; these will be explained in further detail. The insulating plate 64 is also inserted through the socket disk 48 and soldered therein. In FIG. 11, adjacent to the slit 63, the dummy connections 65 may be seen, so that the establishment of a soldered joint is possible on the bottom side of the insulating socket disk 48, thus providing for the improved mounting of the insulating plate 64. The insulating plate 64 has a passage 66, corresponding with the hole 30 of the housing jacket 7 and the hole 31 of the cover 26.

Figure 8:
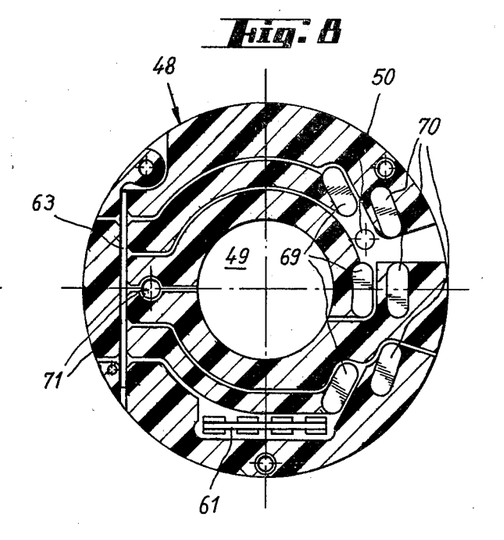
FIG. 8 is a top view of the upper side of the socket disk.

The socket disk 48, as mentioned hereinabove, is equipped on both sides with conductor bars and thus serves as the socket disk both for the above-described chamber 67 of the housing 1 and for the chamber 69 to be described. FIG. 8 is a top view of the socket disk 48 with the conductor bars located thereon. The contact surfaces 69 for the parking light switch and the contact surfaces 70 for the turn signal blinker switch are shown. These contact surfaces are connected by way of the corresponding conductor bars with the conductor bars on the inner side of the second insulating plate 64; the latter may be seen in FIG. 10. Another hole 71 in the socket disk 48 serves to support an annular slide 72 (FIG. 1) and the switch lever 73 associated with it. The slide 72 is provided with an integrally formed gudgeon 74, 75, with the gudgeon 74 engaging the passage 71 of the socket disk 48. The slide 72 carries the connecting bridges 76 for the turn signal blinker switch and the parking light switch; these are not shown individually. Further, a locking pin 78 is inserted in a recess 77 on the front side of the slide 72, said locking pin being placed under stress by a spring 79. The switching lever 73 carries a hook-like driving tongue 80 for the slide 81 in order to switch the headlights.

The switch housing 1 is closed off at the upper front edge of the housing jacket 7 by a cover plate 82, said cover plate having a passage 83 for the insertion of the gudgeon 75 and an annular wall section 84 wherein locating means 85 are integrally formed for the switching positions of the turn signal blinker switch. The cover plate 82 has a foot 86 with a hole 87, (see FIG. 5), aligned with the passage 9 of the bearing bracket 8'. In the cover plate 82, two additional holes, not shown, are provided and aligned with the bushings 19.

The switching lever 73 with the slide 72 may be rotated around the axis defined by the gudgeons 74 and 75 and also tilted in a plane parallel to the axis of the supporting sleeve 2. During this tilting motion, the slide 72 is supported in the area of the connecting bridges and the gudgeons 74 and 75 are displaced in the hole 71 of the socket disk 48 and in the passage 83 of the cover plate 82.

Figure 4:
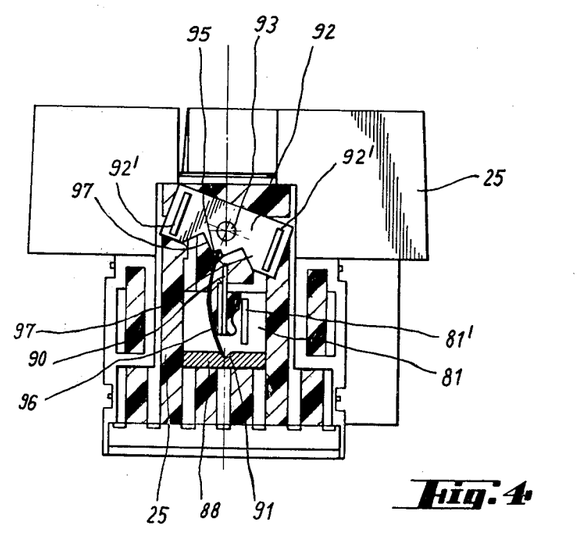
FIG. 4 is a view in the direction of the arrow IV of FIG. 1.
Figure 5:
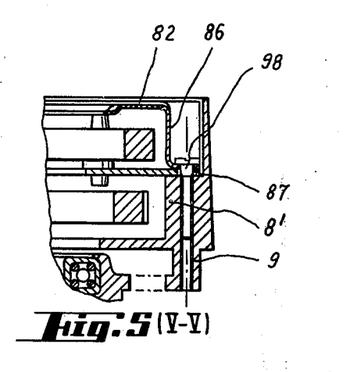
FIG. 5 is a section taken on the line V—V in FIG. 3.

FIG. 4 is a view of the chamber 25 with its cover removed. The slide 81 may be seen, together with a light and horn contact bridge 81', having a twice bent web 88 and a passage 89 for the engagement of the driver tongue 80, see FIG. 1. The slide 81 is equipped with a single piece, integrally formed, yielding tongue 90 and a knife edge bearing 91 in the web 88. A switching rocker 92 is bearingly supported with an axle stump 93 in the hole 31 of the cover 26 and with a further axle stump 94 in the hole 30 of the housing jacket 7. The axle stump 94 also penetrates through the passage 66 of the insulating plate 64 and thus secures this insulating plate against axial movement. The switching rocker 92 has a knife edge bearing 95. Between the knife edge bearings 91 and 95 a leaf spring 96 is stressingly mounted. In the base position shown in FIG. 4, the leaf spring 96 is nearly in its straight position and is thus at its greatest stiffness, so that the slide 81 and thus also the switching lever 73 are retained in their base position by means of said leaf spring 96. During the upward motion of the slide 81 (with reference to FIG. 4) the leaf spring 96 is buckled outwardly so that its compressive force is diminished and resistance is reduced during the switching motion.

The switching rocker 92 carries two connecting bridges 92' for the switching of headlights, said connecting bridges cooperating with the contact surfaces on the outside of the insulating plate 64 shown in FIG. 12.

The switch housing 1 is an injection molded thermoplastic part and, therefore, drops from the tool in a single piece requiring no finishing operations. To assemble the switch, the slide 33, together with the switching lever 34, are placed on the gudgeon 32. The socket disk 48 with the conductor plates 62 and 64 is then inserted in passages of the bottom wall 6. The socket disk 48 is placed on the bearing brackets 8 and 8' and will thus be centered. The locking lashes 22 on the inner walls of the chamber 21 engage the locking notches of the insulating plate 62, not shown in detail, and thereby lock the arrangement in place. The switching rocker 92 and the slide 81 may now be mounted. The cover 26 is clipped onto the chamber 25. The slide 72 with the switching lever 73 is inserted in the manner shown in FIG. 1. Following the rotation of the connecting strips 18 of the housing jacket 7 into place, so that the bushings 19 are aligned with the bearing brackets 8, the cover plate 82 is set in place. Three screws 98 are inserted in the passages of the cover plate and the hole 97 of the foot 86, respectively, and pass through the bushings 19, the passages 51 of the socket disk and the bearing brackets 8, 8'. The screws penetrate the threads of the reinforcing sleeves 10 within the passages 9 of the bearing brackets. By the action of these three screws 98, the entire switching assembly is held together and also centered.

The switching lever 73 may be rotated for the actuation of the turn signal blinker switch or the parking light switch, respectively, around the axis passing through the gudgeons 74 and 75. In addition, the switching lever 73 may be raised by means of a tilting motion with respect to FIG. 1, resulting in moving of the slide 81 for a switching of the headlights or the actuation of lights and the horn. The slide 81 reverses the switching rocker 92, with the aid of the tongue 90 by means of the switching profiles 97.

Figure 7:
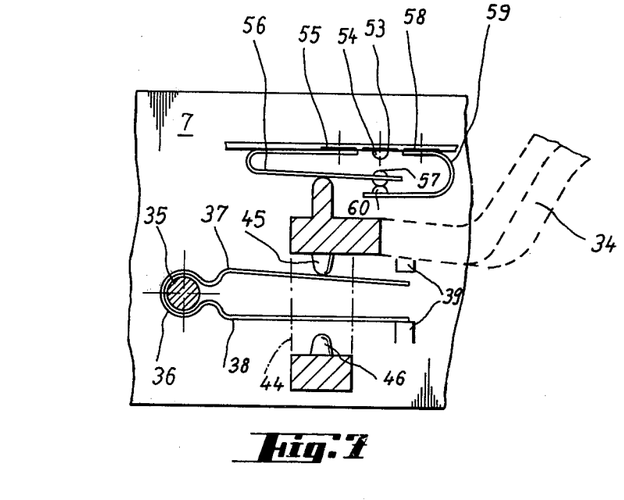
FIG. 7 is a corresponding section showing the opposite switching position.

The switching lever 34 may also be rotated around the gudgeon 32, whereby the different wiper positions, including interval wiping, are actuated. The switching lever 34 may also be tilted, which provides two fingertip controls as shown in FIGS. 6 and 7.

In the above-described embodiment of the invention, the socket disk 48 and the insulating plates 62 and 64 are formed by printed circuits soldered together. The socket disk 48 with the insulating plates 62 and 64 may also be manufactured in a single piece as an injection molded thermoplastic part and the conductor bars applied by means of vapor deposition or an equivalent technique.

Figure 2:
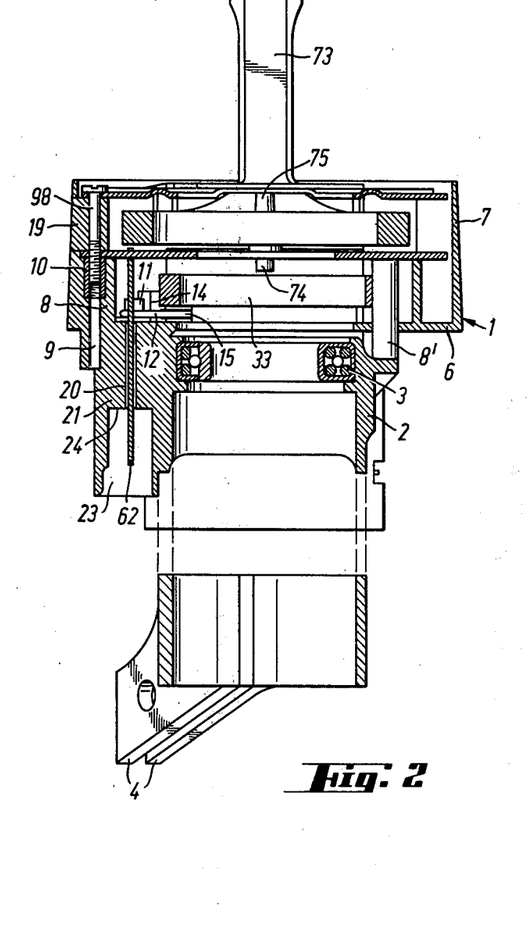
FIG. 2 is a section taken on the line II—II in FIG. 1.
Figure 3:
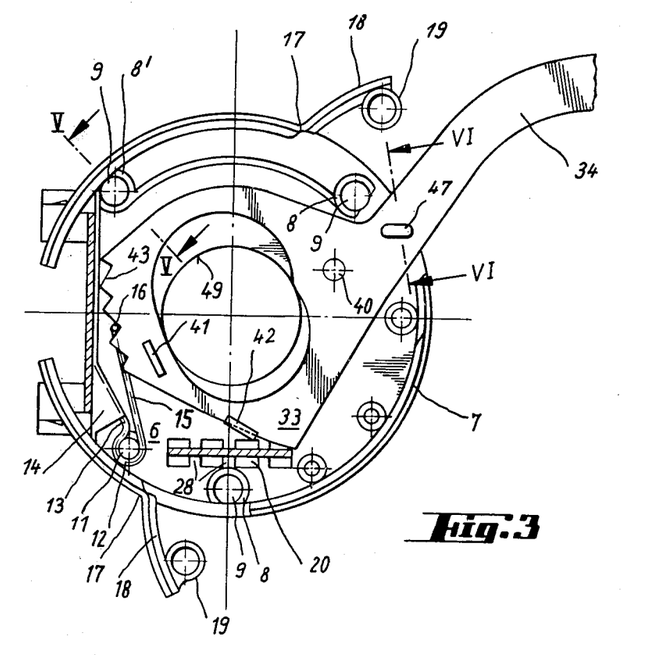
FIG. 3 is a section taken on the line III—III in FIG. 1.
Figure 14:
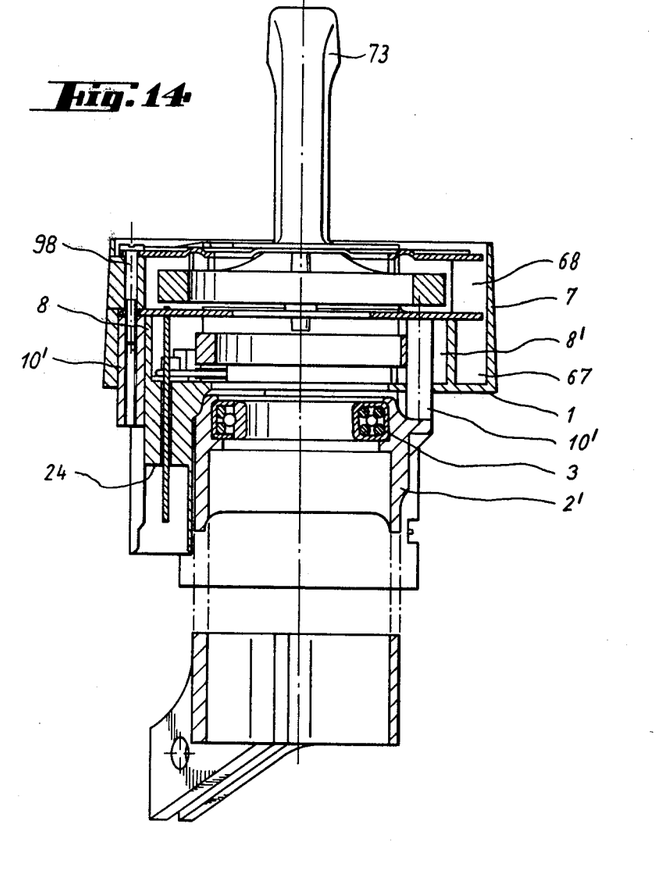
FIG. 14 is a section corresponding to FIG. 2 showing a modified form of the invention.

FIG. 14 is a section similar to FIG. 2 through a modified embodiment of the invention. The supporting sleeve 2' is here present in the form of a pressure cast part with the sleeves 10' as single pieces. The housing 1 designed as an injection molded plastic part encompasses with the bearing brackets 8 the sleeves 10'. By means of the screws 98, the entire arrangement is held together, as described hereinabove. Otherwise, the design of this switching assembly conforms exactly to that of the previously described embodiment.

I claim:

1. A steering column assembly switch comprising:
   an integral housing defining a supporting sleeve and an annular chamber configured to surround the steering column of a vehicle;
   said annular chamber having a bottom wall provided with sockets extending downwardly from said chamber;
   a separate annular partition of insulating material in said annular chamber and dividing the same into upper and lower chambers, said annular partition being a printed circuit board having conductor bars and switch contacts on opposite faces thereof exposed to said upper and lower chambers, respectively;
   an annular rotatable and tiltable contact member in each of said chambers having contact means selectively engageable with said switch contacts;
   said conductor bars having portions extending axially of said annular chamber into said sockets for connection to external electric circuits.

2. A steering column assembly switch as defined in claim 1 wherein said annular partition is made as a single piece from a synthetic thermoplastic material with said conductor bars and switch contacts fixed thereon.

3. A steering column assembly as defined in claim 1 wherein said switch contacts comprise thickened portions of said conductor bars.

4. A steering column assembly switch as defined in claim 1 wherein said lower chamber extends outwardly and defines two chambers, one of which opens laterally of said housing and is closed by a clip-on cover.

5. A steering column assembly switch as defined in claim 1 wherein said sockets are provided with ribs between which said axially extending portions of said conductor bars extend.

6. A steering column assembly switch as defined in claim 1 wherein said lower chamber houses a slidable contactor having an elastic tongue and a rocker member arranged to be actuated by said tongue, said rocker member having contact bridges for selectively engaging certain of said axially extending portions of said conductor bars, one of said rotatable and tiltable contact members having a portion for actuating said slidable contactor, and an over center resilient member for holding said rocker member in a selected position of tilt.

7. A steering column assembly switch as defined in claim 6 wherein said lower chamber extends outwardly and defines two chambers, one of which opens laterally of that housing and is closed by a clip-on cover, said axially extending portions of said conductor bars being supported by an insulating plate, said rocker member having a pivot journalled in said plate and in said clip-on cover.

8. A steering column assembly switch as defined in claim 1 wherein said bottom wall is provided with upstanding spacer means supporting said annular partition, a portion of said housing having a foil layer thereon and connector means on said foil swingable into alignment with said spacer means to establish a ground connection for conductor bars on said annular partition.

9. A steering column assembly switch as defined in claim 1 wherein said axially extending portions of said conductor bars are on an insulating support plate, said support plate and its socket having cooperating spring latch means.

10. A steering column assembly switch as defined in claim 1 including a spring member having two legs extending between and normally engaging a pair of spaced stops, one of said rotatable and tiltable contact members having a fork-like extension embracing said spring legs, said spring members thus serving to hold said contact member in a central position of tilt.

11. A steering column assembly switch as defined in claim 1 wherein the lower face of said annular partition is provided with a switch contact engageable by a leaf spring contact arranged in the path of tilting movement of one of said rotatable and tiltable contact members.

12. A steering column assembly switch as defined in claim 1 including a serrated edge on the rotatable contact member in said lower chamber and a resilient member engaging said serrated edge to releasably hold the same in a selected position of rotation, said resilient member being a spring wire having an end portion bent laterally to engage said serrated edge, said end portion being of convex shape on the side thereof facing said serrated edge.

* * * * *